(12) United States Patent
Bucknell

(10) Patent No.: US 7,913,551 B2
(45) Date of Patent: Mar. 29, 2011

(54) TIRE PRESSURE GAUGE WITH CAP WRENCH

(75) Inventor: Christine Anderson Bucknell, West Yorkshire (GB)

(73) Assignee: Measurement Ltd., Grand Cayman (KY)

( * ) Notice: Subject to any disclaimer, the term of this patent is extended or adjusted under 35 U.S.C. 154(b) by 0 days.

(21) Appl. No.: 12/787,267

(22) Filed: May 25, 2010

(65) Prior Publication Data

US 2010/0229640 A1    Sep. 16, 2010

Related U.S. Application Data

(63) Continuation of application No. 12/258,972, filed on Oct. 27, 2008, now Pat. No. 7,721,592.

(60) Provisional application No. 61/000,702, filed on Oct. 26, 2007.

(51) Int. Cl.
*B60C 23/02* (2006.01)

(52) U.S. Cl. .................. 73/146.8; 73/146.3; 340/442

(58) Field of Classification Search .................. None
See application file for complete search history.

(56) References Cited

U.S. PATENT DOCUMENTS

| 3,852,839 A | 12/1974 | Blessing |
| D247,429 S | 3/1978 | Teal |
| D259,863 S | 7/1981 | Eller |
| 4,526,030 A | 7/1985 | Vecera, Jr. |
| D280,215 S | 8/1985 | Huang |
| D286,270 S | 10/1986 | Huang |
| 4,617,821 A * | 10/1986 | Yokoyama et al. ............ 73/23.3 |
| D294,229 S | 2/1988 | Bonazzi |
| 4,748,845 A | 6/1988 | Rocco et al. |
| D300,729 S | 4/1989 | Skaggs |
| 4,827,764 A | 5/1989 | Hwang |
| 4,845,980 A | 7/1989 | Weng |
| 4,916,944 A | 4/1990 | Ho-Chuan |
| 4,924,697 A | 5/1990 | Hunt et al. |
| D314,159 S | 1/1991 | O'Connor |
| 4,998,438 A | 3/1991 | Martin |
| D316,980 S | 5/1991 | Brinker et al. |

(Continued)

FOREIGN PATENT DOCUMENTS

DE    19837550 A1    2/1999

(Continued)

OTHER PUBLICATIONS

UK Search Report dated Jun. 11, 2007.

*Primary Examiner* — Lisa M Caputo
*Assistant Examiner* — Jermaine Jenkins
(74) *Attorney, Agent, or Firm* — Howard IP Law Group, PC

(57) ABSTRACT

A tire pressure gauge with a valve cap wrench is disclosed. A bore at one end of the tire pressure gauge may be used to grip and remove a valve cap mounted on a valve stem of a tire. A port at the other end of the tire pressure gauge may be used to measure air pressure in a tire. The measured air pressure may be displayed on a display on the tire pressure gauge. The cap wrench may have a collet to hold a valve cap and a switch to tighten and loosen grip on a valve cap. The cap wrench may also have a plunger to push a valve cap out of the tire pressure gauge.

20 Claims, 9 Drawing Sheets

U.S. PATENT DOCUMENTS

| | | |
|---|---|---|
| D317,880 S | 7/1991 | Meehan |
| 5,033,296 A | 7/1991 | Huang |
| D320,170 S | 9/1991 | Hwang |
| D320,756 S | 10/1991 | Ohno et al. |
| 5,117,684 A | 6/1992 | Hwang |
| D331,371 S | 12/1992 | Weng |
| D335,465 S | 5/1993 | Garrison, III |
| D336,735 S | 6/1993 | Nulsen |
| D337,730 S | 7/1993 | Rosenfeld |
| D338,839 S | 8/1993 | Akins |
| D349,659 S | 8/1994 | Huang |
| D352,252 S | 11/1994 | Huang |
| D361,950 S | 9/1995 | Mascio |
| D366,845 S | 2/1996 | Handfield et al. |
| D366,846 S | 2/1996 | Handfield et al. |
| 5,496,740 A * | 3/1996 | Williams .................. 436/132 |
| 5,614,669 A | 3/1997 | Sopcisak |
| D390,140 S | 2/1998 | Germanton |
| D395,835 S | 7/1998 | Okuyama et al. |
| D402,997 S | 12/1998 | Campbell et al. |
| D409,509 S | 5/1999 | Petrucelli et al. |
| D409,931 S | 5/1999 | Petrucelli et al. |
| D419,085 S | 1/2000 | Prus |
| D420,299 S | 2/2000 | Jahn |
| D427,092 S | 6/2000 | Wu |
| D427,093 S | 6/2000 | Wu |
| D440,893 S | 4/2001 | Van Zeyl |
| D440,894 S | 4/2001 | Van Zeyl |
| D440,895 S | 4/2001 | Van Zeyl |
| D441,674 S | 5/2001 | Van Zeyl |
| D447,970 S | 9/2001 | Cappiello et al. |
| D450,257 S | 11/2001 | Bressler et al. |
| D455,361 S | 4/2002 | Super et al. |
| D455,666 S | 4/2002 | Cappiello et al. |
| D458,857 S | 6/2002 | Tseng |
| D459,257 S | 6/2002 | Petrucelli |
| D459,668 S | 7/2002 | Petrucelli |
| D460,704 S | 7/2002 | Peele |
| D462,627 S | 9/2002 | Petrucelli |
| D469,706 S | 2/2003 | Huang |
| D474,124 S | 5/2003 | Krieger et al. |
| D488,082 S | 4/2004 | Durr et al. |
| D491,480 S | 6/2004 | Huang et al. |
| D492,608 S | 7/2004 | Fujioka |
| D496,602 S | 9/2004 | Shipman |
| D498,154 S | 11/2004 | Wang |
| 6,817,235 B2 | 11/2004 | Sapir |
| D501,146 S | 1/2005 | Durr et al. |
| 6,838,983 B1 | 1/2005 | Wong |
| D501,417 S | 2/2005 | Tseng |
| D501,418 S | 2/2005 | Wang |
| D502,214 S | 2/2005 | Davis et al. |
| D502,656 S | 3/2005 | Fujioka |
| D502,734 S | 3/2005 | Davis et al. |
| D502,735 S | 3/2005 | Davis et al. |
| D503,898 S | 4/2005 | Durr et al. |
| D504,630 S | 5/2005 | Wang |
| D505,088 S | 5/2005 | Durr et al. |
| D505,871 S | 6/2005 | Little et al. |
| D505,872 S | 6/2005 | Durr et al. |
| D506,154 S | 6/2005 | Cowan et al. |
| 7,013,722 B2 | 3/2006 | Little et al. |
| 7,040,153 B2 | 5/2006 | Kroll et al. |
| 7,185,533 B2 | 3/2007 | Lee et al. |
| 7,383,724 B2 * | 6/2008 | Petrucelli .................. 73/146 |
| 2004/0187567 A1 | 9/2004 | Durr et al. |
| 2005/0050951 A1 | 3/2005 | Jardin |
| 2005/0103108 A1 | 5/2005 | Little et al. |
| 2005/0138999 A1 | 6/2005 | Petrucelli |

FOREIGN PATENT DOCUMENTS

| | | |
|---|---|---|
| DE | 19814287 A1 | 10/1999 |
| GB | 2169411 A | 7/1986 |
| WO | 9607568 | 3/1996 |

* cited by examiner

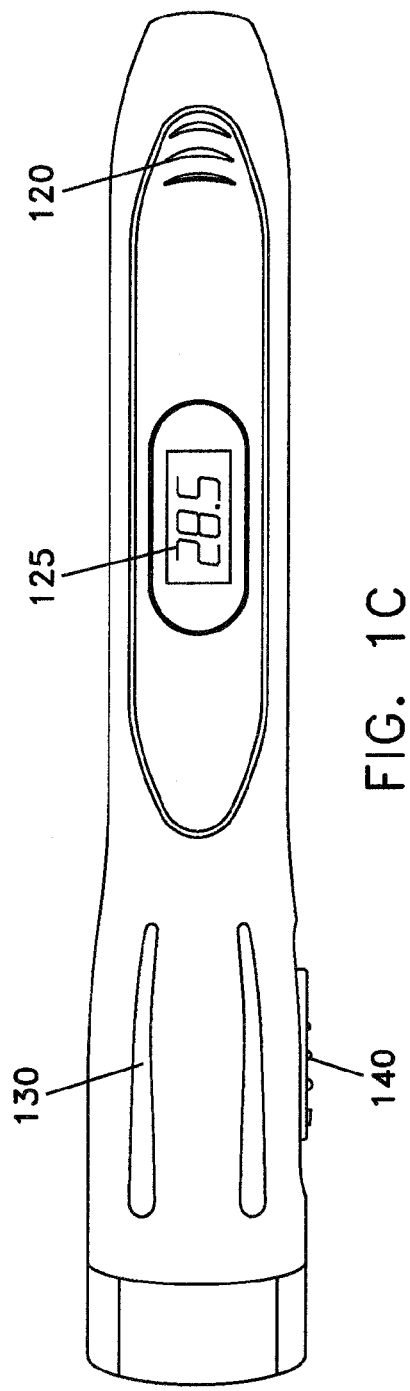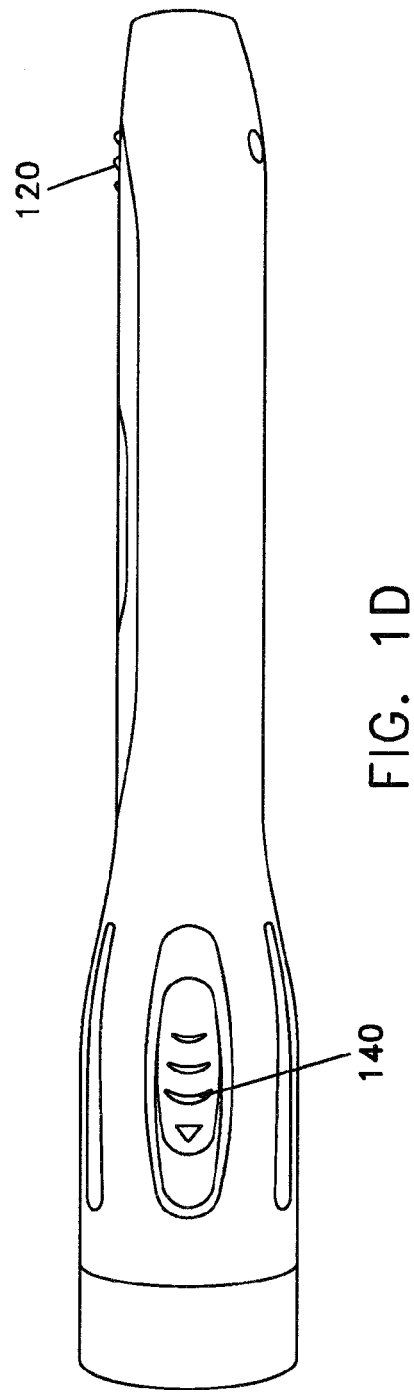
FIG. 1C
FIG. 1D

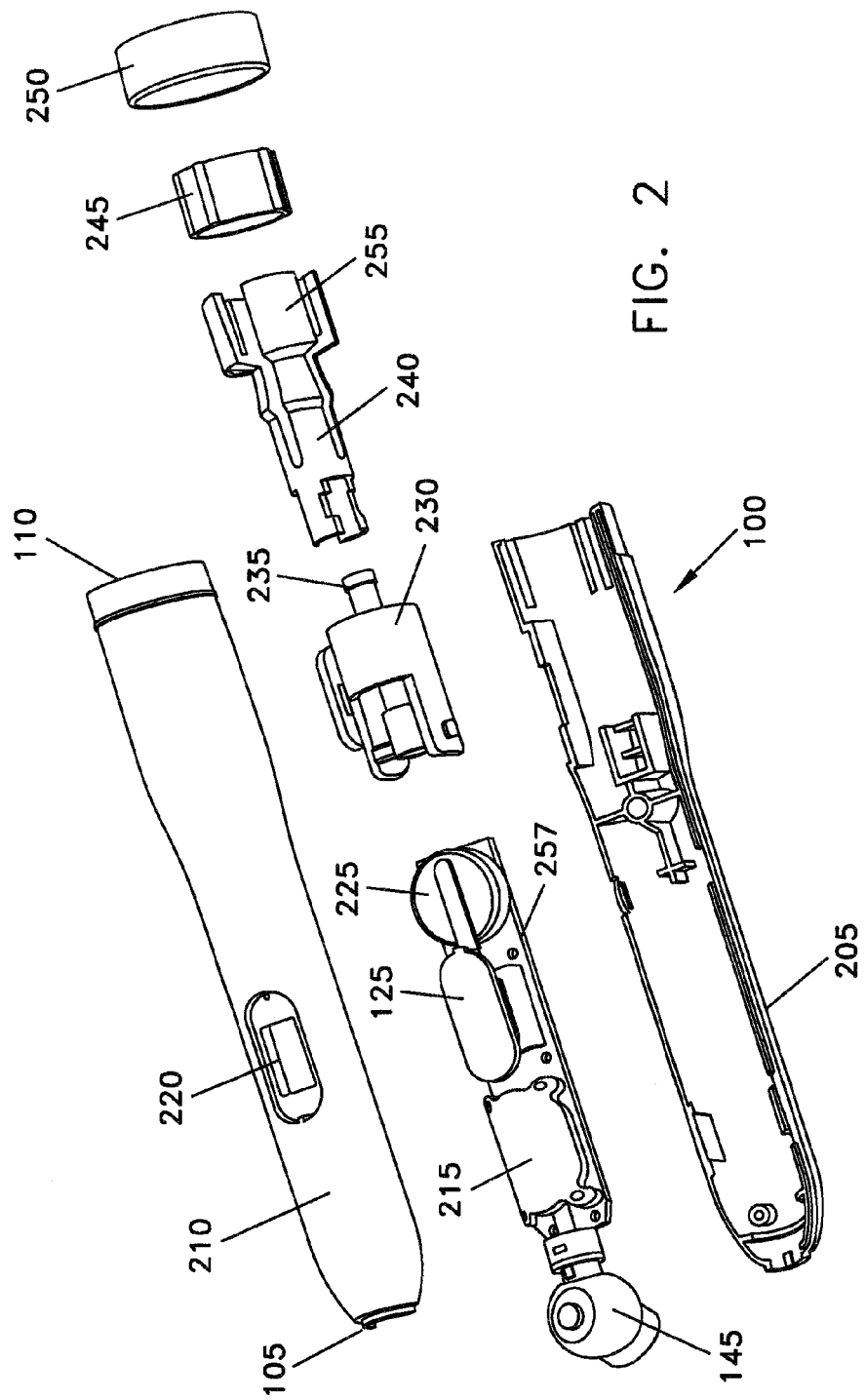

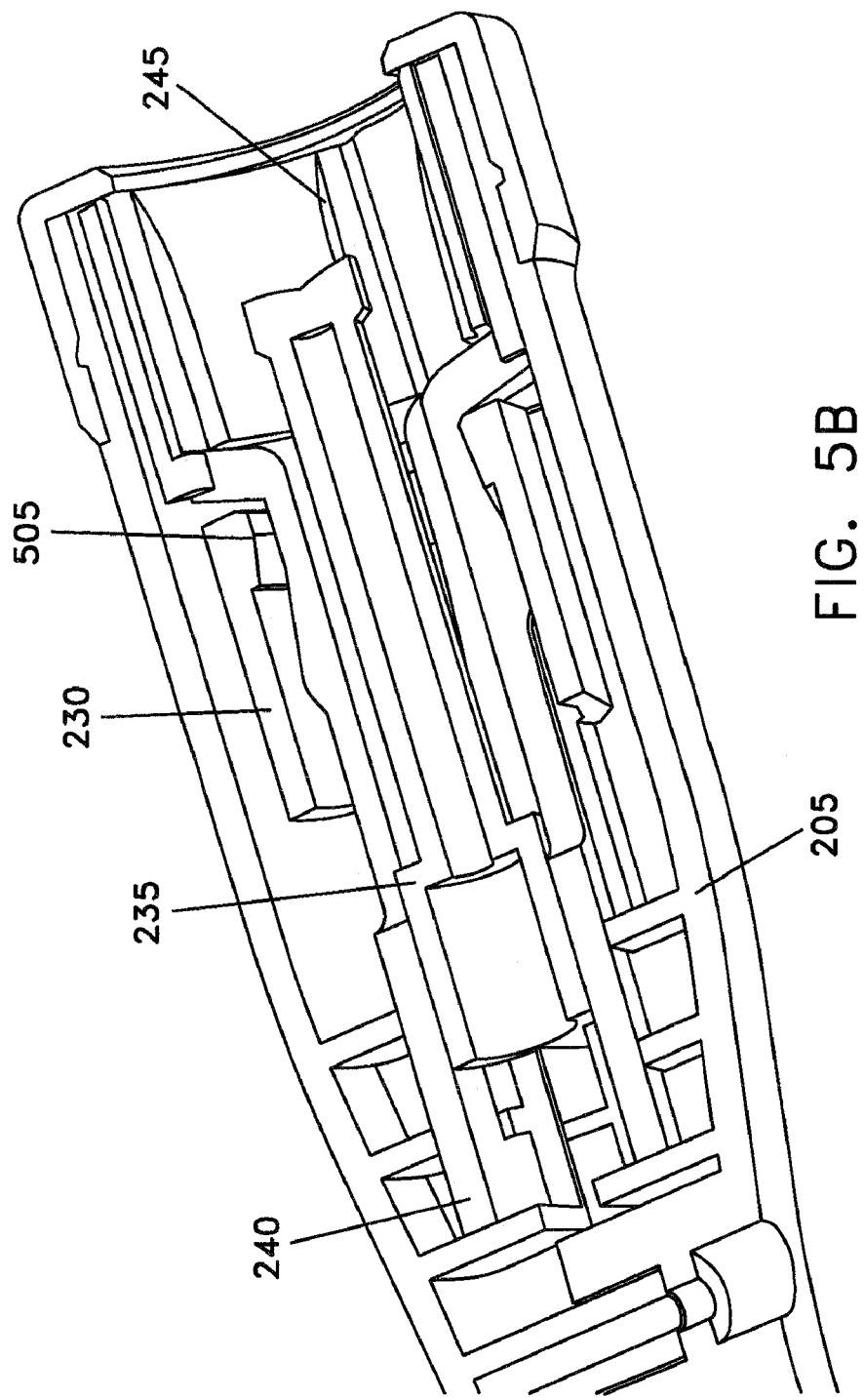

TIRE PRESSURE GAUGE WITH CAP WRENCH

RELATED CASES

This application claims priority benefit under 35 U.S.C. §120 and is a continuation application of U.S. patent application Ser. No. 12/258,972, filed Oct. 27, 2008, which application claims priority benefit under 35 U.S.C. §119(e) to U.S. Provisional Patent Application Ser. No. 61/000,702, filed Oct. 26, 2007, which applications are hereby incorporated by reference herein in their entireties.

FIELD OF THE INVENTION

The present invention relates generally to a pressure gauge and more particularly to a tire pressure gauge with a cap removal wrench.

BACKGROUND OF THE INVENTION

Pressure gauges are conventionally used for measuring the pressure of a gas or a liquid, such as an air pressure. Tire pressure gauges, as an example, measure the inflation pressures of vehicle tires, such information being useful for maintaining optimal tire performance and avoiding unnecessary wear. Conventional tire pressure gauges are held in the hand, and require the user to locate a tire valve, unscrew a cap from the valve, and engage the tire pressure gauge with the valve. Tire valve caps are usually covered in a film of dirt, which comes off on the user's fingers when removing and replacing the cap. Sometimes, tire valve caps may be difficult to remove because dirt may be lodged between the valve stem and the cap. Under such circumstances, some amount of force may be required to remove the cap. There are also occasions when an individual may not want to sully one's hands with the grime on the valve caps.

SUMMARY OF THE INVENTION

A tire pressure gauge with cap wrench has a housing. A bore is defined in the housing and is adapted to accommodate a tire valve stem cap. The pressure gauge further includes a collet positioned in the bore and is adapted to selectively engage and disengage the tire valve stem cap. A user-operable switch is mechanically coupled with the collar and is adapted to cause said collet to selectively engage and disengage the tire valve stem cap. A port is defined in the housing and is adapted to engage and open a needle valve on a tire valve stem. The tire pressure gauge further includes a pressure sensor positioned in the housing. The pressure sensor is adapted to be in fluidic communication with a fluid in a tire when the port engages and opens the needle valve on the tire valve stem and to measure the pressure of the fluid in the tire. The tire pressure gauge also includes a display on the housing to display a numerical value indicative of the measured pressure.

According to an embodiment of the invention, a combined tire pressure gauge and valve cap wrench includes a housing having a bore and a port. The port is adapted to engage and open a needle valve on a tire valve stem. A collet is positioned in the bore and includes a generally cylindrical section defining a plurality of longitudinal slits. A ramp is defined on the generally cylindrical section and a plurality of arms extends from the generally cylindrical section. An inward depression of the ramp causes a concentric contraction of the plurality of arms and an outward release of the ramp causes a concentric expansion of the plurality of arms. The combined tire pressure gauge and valve cap wrench also includes a sleeve positioned along an interior surface defined by the plurality of arms. The sleeve is adapted to contract and expand concentrically, responsive to concentric contraction and expansion of the plurality of arms respectively, thereby establishing and releasing a generally firm grip over a tire valve stem cap accommodated in the bore respectively. A collar having an inwardly protruding circumferential lip is positioned generally concentrically with the collet. The lip is adapted to engage the ramp to either inwardly depress the ramp to outwardly release the ramp. A user-operable switch is coupled to the collar and disposed on the housing. The switch is adapted to cause the collar to slide about the collet and cause the lip to inwardly depress or outwardly release the ramp, thereby selectively causing the plurality of arms and the sleeve to either concentrically contract and establish a generally firm grip over a tire stem valve cap accommodated in the bore or to concentrically expand and release a generally firm grip over a tire valve stem cap accommodated in the bore. The combined tire pressure gauge and valve cap wrench further includes a pressure sensor positioned in the housing. The pressure sensor is adapted to be in fluidic communication with a fluid in a tire when the port engages and opens the needle valve on the tire valve stem and to measure the pressure of the fluid in the tire. A display on the housing displays a numerical value indicative of the measured pressure.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts and in which:

FIGS. 1C-1D show a top view and a side view of a tire pressure gauge with cap wrench, as per an embodiment of the invention;

FIG. 2 show an exploded view of a tire pressure gauge with cap wrench as per an embodiment of the invention;

FIG. 5B illustrates a cross-sectional view of cap wrench of FIG. 5A; and

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in pressure gauges. However, because such elements are well known in the art, and because they do not facilitate a better understanding of the present invention, a discussion of such elements is not provided herein. The disclosure herein is directed to all such variations and modifications known to those skilled in the art.

Further, it should be understood that the several views of the housings, displays and general configurations shown in the figures include many decorative or ornamental features, aspects of which the particulars may be changed while maintaining the device's utility and without departing from the scope and spirit of the present invention.

Figure 1A:
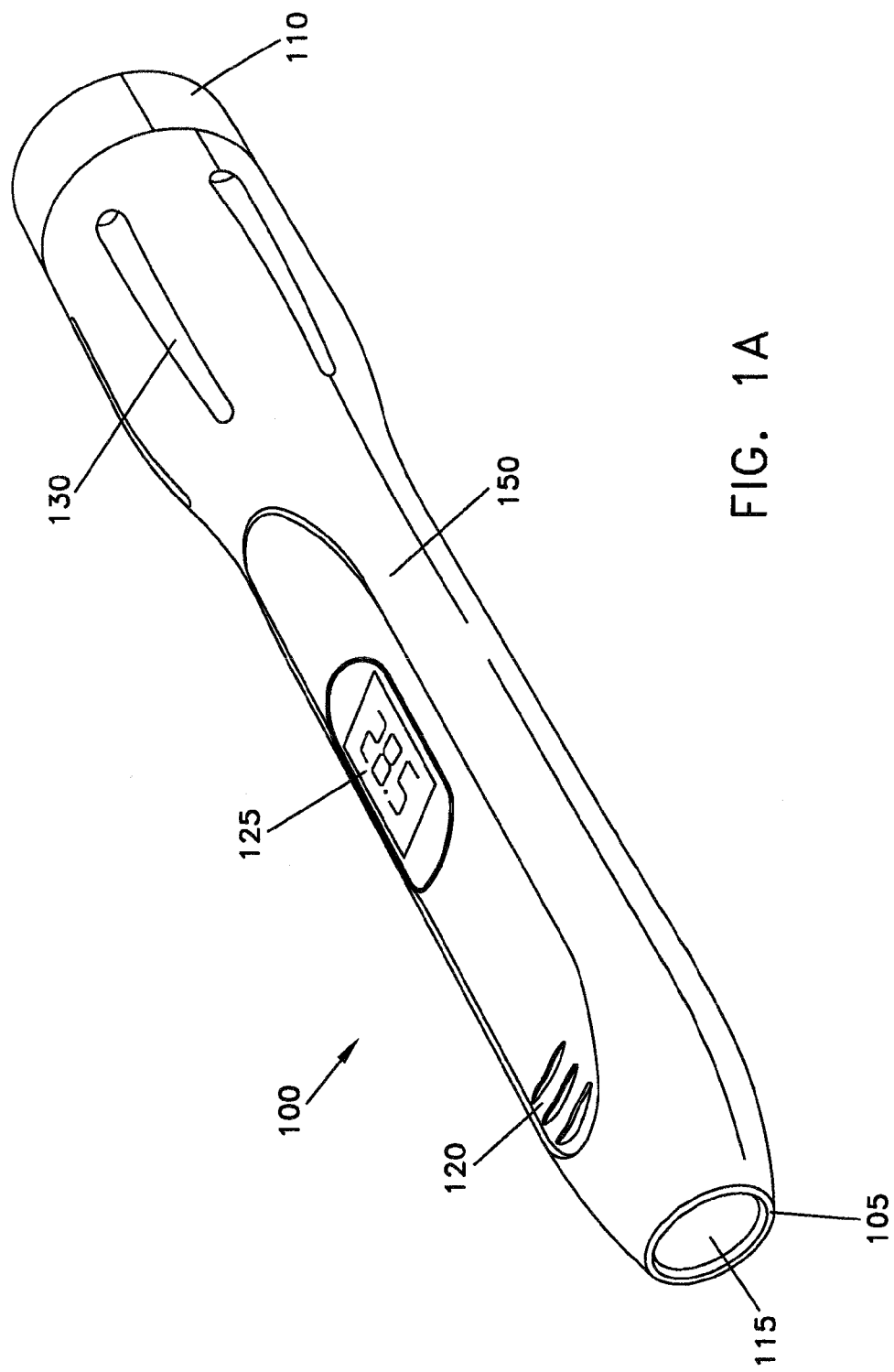
FIGS. 1A-1B illustrate two perspective views of a tire pressure gauge with cap wrench as per an embodiment of the invention.

Now referring to FIG. 1A, a perspective view of an exemplary embodiment of a tire pressure gauge with cap wrench 100 is illustrated. Gauge 100 has an elongated housing 150 with two ends 105, 110. End 105 has a port 115 adapted to engage with and open the needle valve on a suitable tire valve stem. A tire valve stem is typically in the form of a tube, threaded on the exterior near the end thereof, to permit attachment of a protective cap, and having a valve, referred to variously as a pin valve, bleeder valve, or Schrader valve. This type of valve is kept normally closed by a combination of air pressure and a spring urging a stopper into contact with an opening. A pin extending out of the valve may be urged inward, such as by a piston in a nozzle of a service station air hose, to open the valve to permit the introduction of pressurized air into the tire. Port 115 may include such a pin.

Proximal to end 105 is an uneven surface/area 120, which facilitate a firm gripping of gauge 100 when measuring air pressure of a tire. In the illustrated embodiment, area 120, adjacent to port 115, has ribs. A display 125, on housing 150, displays the measured air pressure in a tire. Display 125 may be, for example, a liquid crystal display. Proximal to end 110 are grip areas 130, adjacent to bore 135 (of FIG. 1B). Grip areas 130 facilitate a firm grip over gauge 100 when it is used to remove or mount a valve cap on a valve stem. Grip areas 130 also visually indicate rotation for removal and mounting of tire valve stem caps or valve caps. Grip areas 130 may be protruding or recessed features of any shape, or pattern and may include both protruding and recessed features. Grip areas 130 may include longitudinal ribs, as illustrated.

Figure 1B:
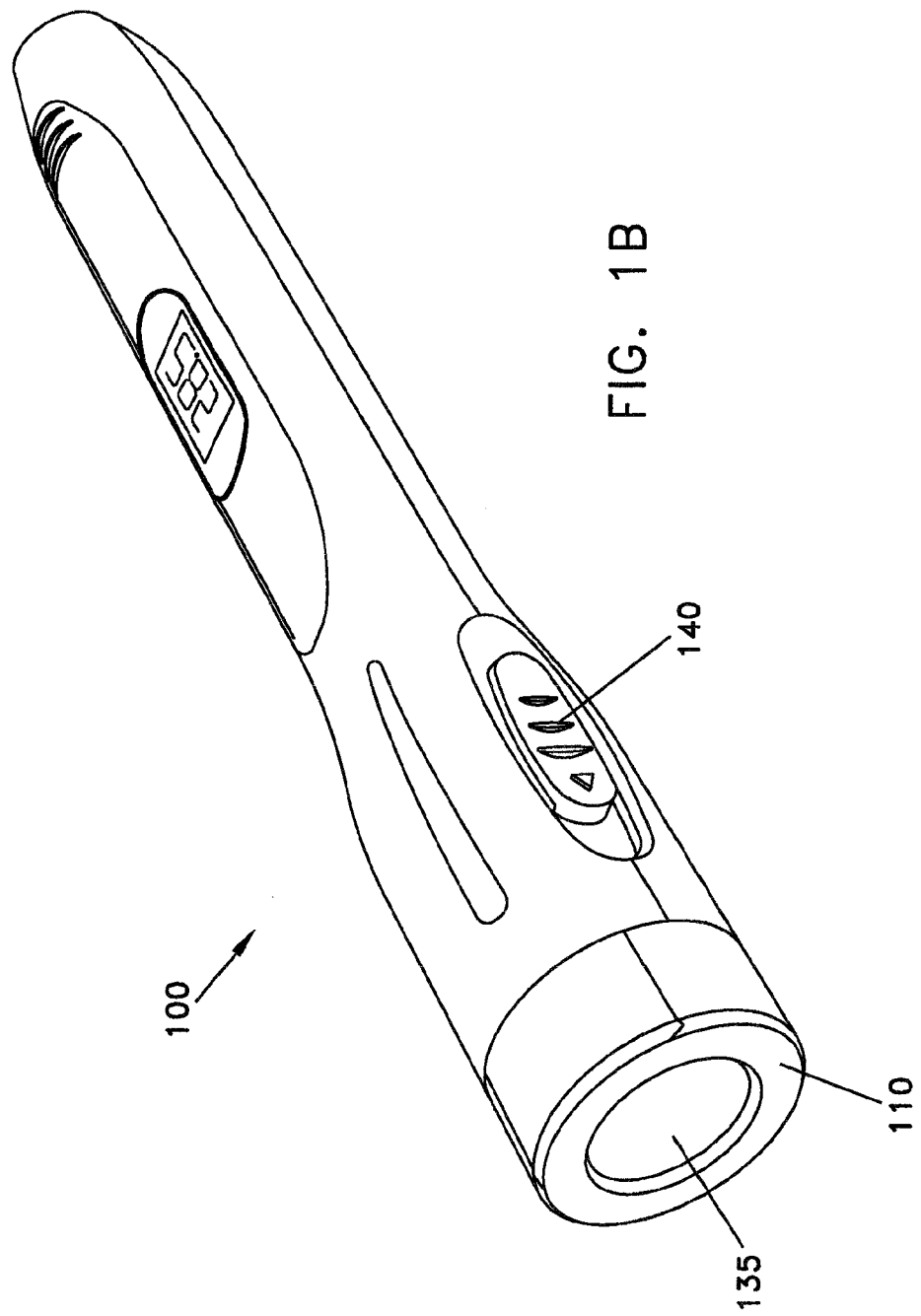

Now referring to FIG. 1B, gauge 100 has a bore 135 at end 110. Bore 135 is configured to accommodate tire valve stem caps of different sizes. In an exemplary embodiment, bore 135 may accommodate valve caps with diameters in the range of 9.2 millimeter (mm) to 12.4 mm. Gauge 100 has a release switch 140, which can grip as well as release a valve cap inside port 135.

FIGS. 1C and 1D illustrate a top view and a side view of a pencil gauge 100, as per an embodiment of the invention.

Figure 1E:
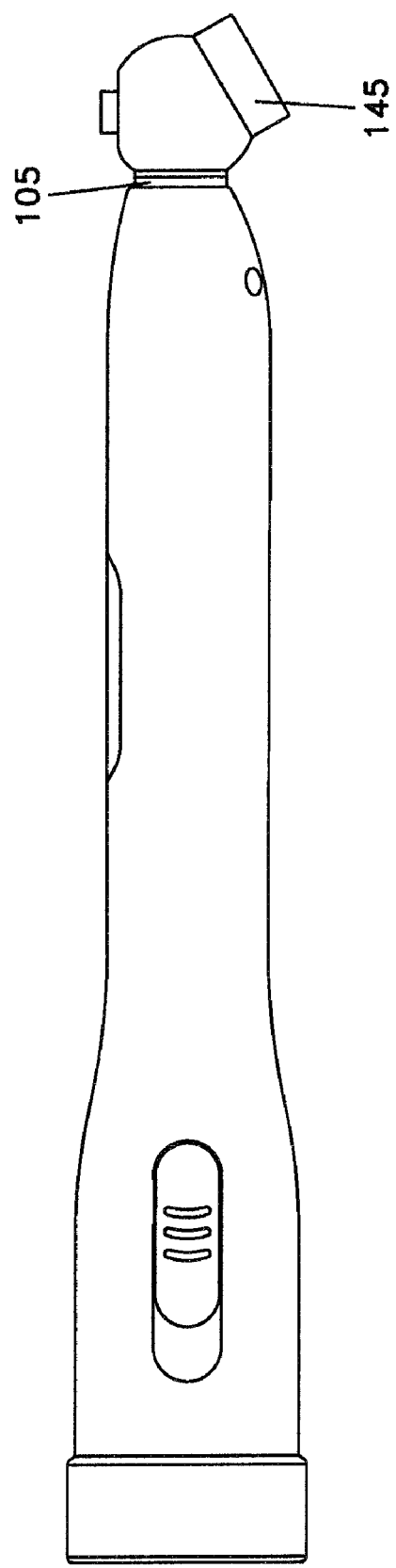
FIG. 1E is a side view of a tire pressure gauge with cap wrench, as per another embodiment of the invention.

Now referring to FIG. 1E, an alternate embodiment of tire pressure gauge 100 is illustrated. At end 105, gauge 100 has an angled ball part 145, which can be positioned over a valve stem to measure air pressure in a vehicle tire.

FIG. 2 illustrates an exploded view of a gauge 100 as per an embodiment of the invention. In an exemplary embodiment, housing 105 of gauge 100 has two housing halves 205, 210. Housing halves 205, 210 collectively house various components of gauge 100, as detailed below. Housing halves 205, 210 may be made of, for example, ABS. Housing halves 205, 210 define a substantially cylindrical housing 150 with open ports 115, 135 at each end 105, 110 respectively. Housing 150 proximal to end 110 has a considerably larger cross-section than the cross-section proximal to end 105. In another embodiment, housing 150 may have a uniform size from end 105 to end 110.

Gauge 100 has a pressure sensor (not shown) in a sensor housing 215. Angled ball part 145 is in fluidic communication with a chamber in sensor housing 215 within which a sensor is disposed. Pressure sensor (not shown) in housing 215 may be any one of a number of conventional sensors for detecting fluid pressure, and particularly air pressure, and selected to provide acceptable response over a range of pressures anticipated in a particular application. By way of example, pressure sensor (not shown) may incorporate a MEMS based pressure die. The output of pressure sensor (not shown) is displayed by display 125. Display 125 may be powered by a power source 225, which, for example, may be a battery.

Components such as pressure sensor (not shown), display 125, and power source 225 may be mounted on a board 257, which in turn is mounted on housing half 205 using known fastening means such as screws. Board 257 may be, for example, made of sintered ceramics.

Still referring to FIG. 2, housing halves 205, 210 further encompasses a collar 230, a plunger 235, a collet 240 having arms 255, and a sleeve 245. A ring 250 caps end 110 of housing 105. In an exemplary embodiment, collar 230, plunger 235 and collet 240 may be injection molded plastic parts, while ring 250 may be a metal ring. Plunger 235 and collar 230 are so connected as to act as a single unit. A release switch 140 is disposed on housing 150. Release switch 140 is attached or mechanically coupled to collar 230. In an embodiment, release switch 140 and collar 230 may be integral. When release switch 140 is pushed in one direction, collar 230 also translates in the same the direction by the same distance. Since plunger 235 is generally rigidly connected to collar 230, movement of release switch 140 will result in similar movement of plunger 235. A sleeve 245 is fitted along arms 255 of collet 240. In an exemplary embodiment, sleeve 245 may be made of an elastomeric material.

Figure 3:
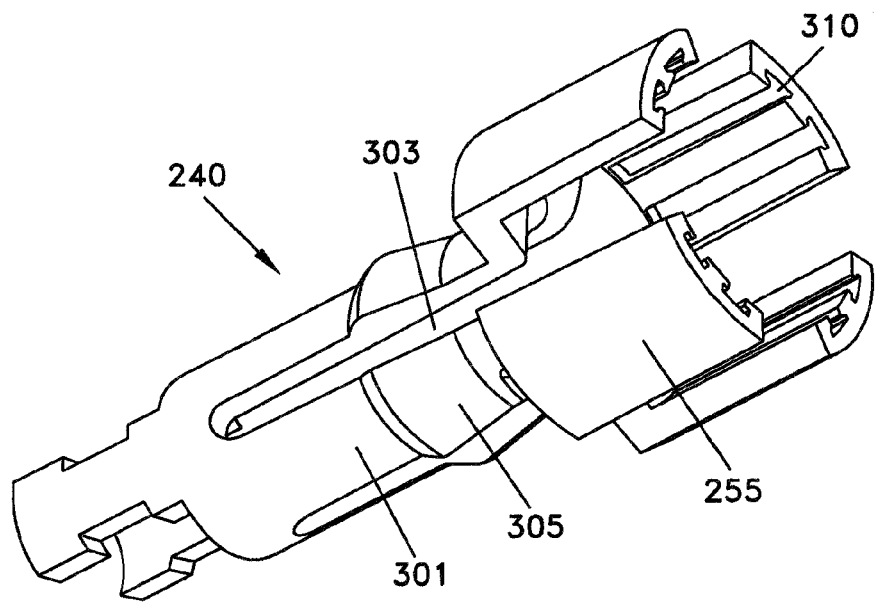
FIG. 3 illustrates a perspective view of an embodiment of a collet used in a tire pressure gauge with cap wrench.

Now referring to FIG. 3, collet 240 is illustrated. Collet 240 has a generally cylindrical section 301. Longitudinal slits 303 are defined in generally cylindrical section 301. Collet 240 has a ramp 305. In an exemplary embodiment, ramp 305 has a taper which narrows towards arms 255. In an alternative embodiment, ramp 305 may have a taper which widens towards arms 255. The illustrated embodiment of collet 240 has four arms 255. Alternative embodiments of collet 240 may have a greater or a lesser number of arms. In an exemplary embodiment of the invention, arms 255 have T-shaped grooves 310. Alternate shapes of grooves are also contemplated to be within the scope of the invention.

Figure 4:
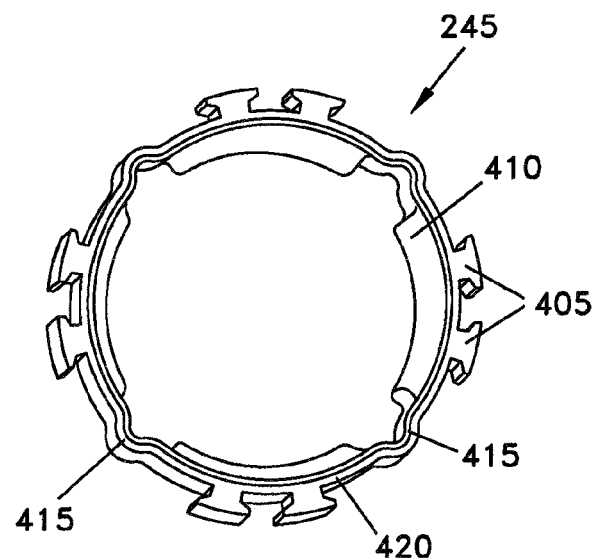
FIG. 4 shows an exemplary embodiment of a sleeve used in conjunction with a collet of FIG. 4 in a tire pressure gauge with cap wrench.

FIG. 4 illustrates an exemplary embodiment of sleeve 245. Sleeve 245 is assembled into arms 255, along an interior surface defined by arms 255, of collet 240. Sleeve 245 may provide grip over a valve cap (not shown) and may reduce wear and tear of arms 255. In an exemplary embodiment of the invention, sleeve 245 has T-shaped longitudinal tabs 405 which are configured to engage with grooves 310 (of FIG. 3). Alternate shaped tabs are also contemplated to be within the scope of the invention such that the tabs may engage with correspondingly shaped grooves on arms 255 (of FIG. 3). Sleeve 245 has a plurality of relatively inflexible sections or pads 410 on the interior surface of sleeve 245. Sections or pads 410 are adapted to engage with the valve caps (not shown) and thus reduce wear and tear of sleeve 245. Pads 410 are inflexible relative to the material of sleeve 245. Sleeve 245 has a plurality of bending sections 415 which may act as springs and facilitate sleeve 245 in regaining its original shape from a contracted state. Bending sections 415 are interspersed between a plurality of curved sections 420.

Figure 5A:
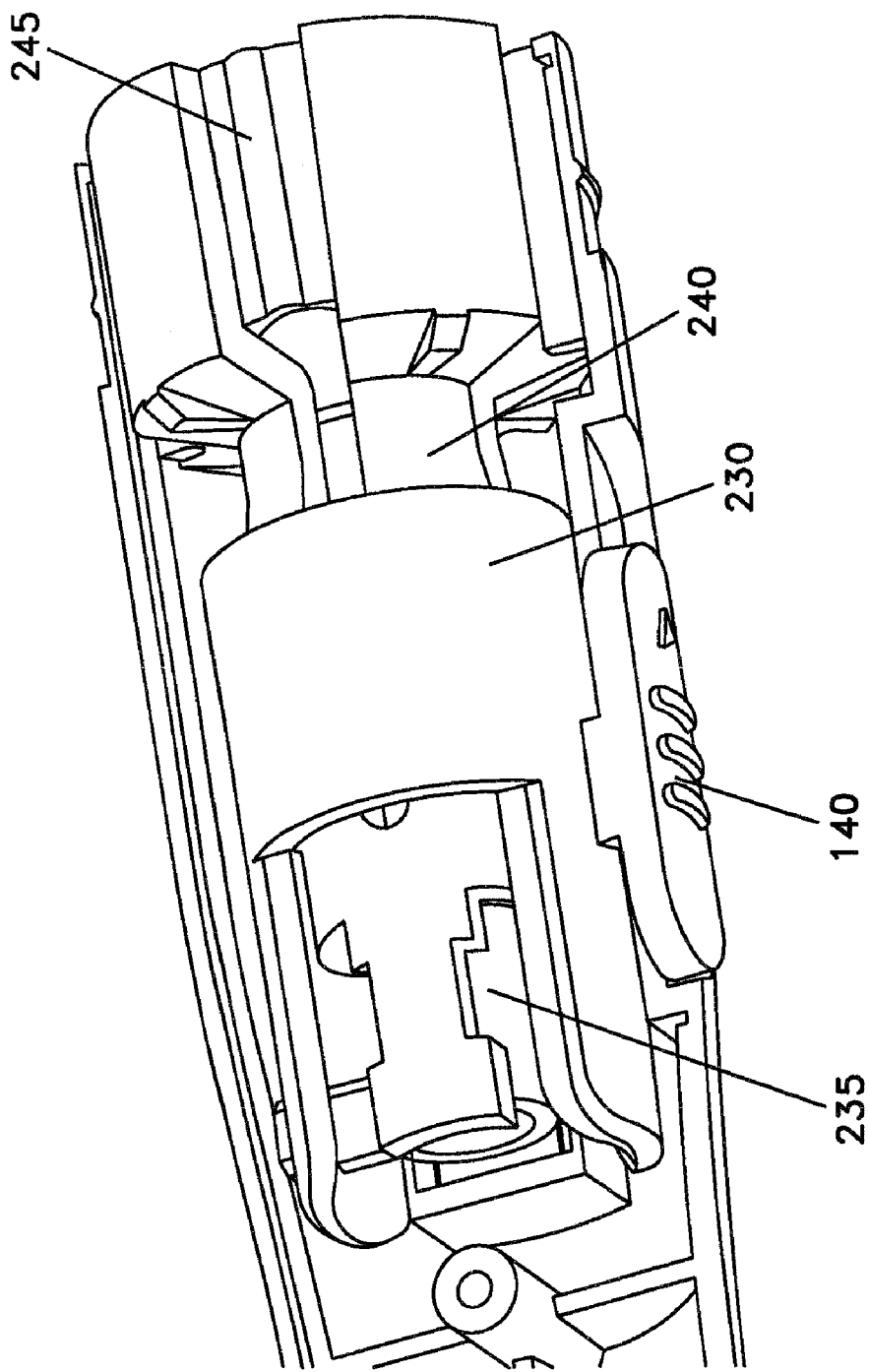
FIG. 5A illustrates an assembly view of cap wrench in an embodiment of a tire pressure gauge with cap wrench.

Referring now to FIGS. 5A-5B, an exemplary assembly for collar 230, plunger 235, collet 240 and sleeve 245 is shown. Collar 230 has a generally cylindrical interior surface having a constant diameter, with an inwardly protruding circumferential lip 505. When release switch 140 is pushed in the direction away from arms 255 of collet 240, collar 230 via lip 505, contacts and urges ramp 305 (of FIG. 3) inward; as a result, arms 255 contract concentrically and urge sections 410 of sleeve 245 inward into contact with the valve cap and establish a generally firm grip over the valve cap (not shown). FIG. 5A illustrates the state where ramp 305 is depressed inwardly via lip 505 of collar 230. Sleeve 245 expands, on the other hand, when release switch 140 is pushed in the direction towards arms 255, collar 230 releases the pressure on ramp 305, causing ramp 305 to be released outwardly, as lip 505 of collar 230 slides away from ramp 305. As a result, arms 255 expand concentrically, and pull sleeve 245 outward and loosen the grip on or disengage completely from the valve cap (not shown). At the same time, plunger 235, which is connected or otherwise mechanically coupled to collar 230, pushes out a valve cap (not shown) and the valve cap is released from gauge 100.

Figure 6:
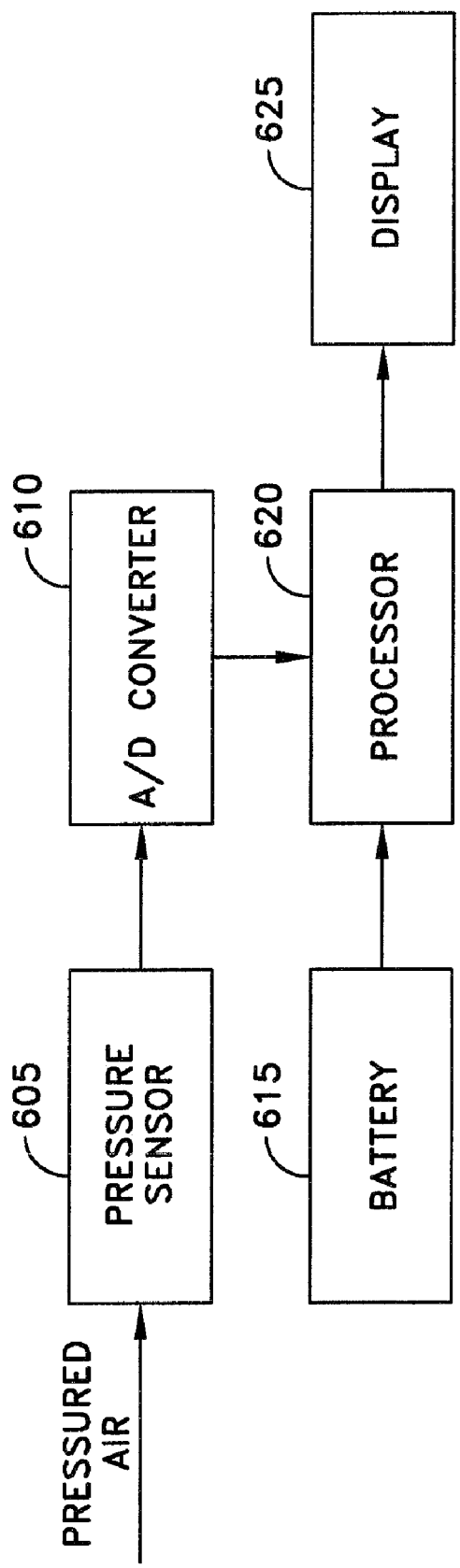
FIG. 6 is a block diagram showing a pressure sensor, analog to digital converter, a processor, a display, and a battery.

Referring now to FIG. 6, a block diagram illustrates the schematically the arrangement of components in tire pressure gauge 100. A pressure sensor 605, when subjected to pressurized air from, for example, a tire, senses the air pressure. Pressure sensor 605 may be within a chamber in fluid communication with the interior of a tire when gauge 100 is measuring pressure. Pressure sensor 605 generates an analog output indicative of the sensed air pressure which is provided to an analog-to-digital converter 610. Converter 610 converts the analog signal received from sensor 605 and generates a digital signal indicative of the measured pressure, which digital signal is provided to a processor 620. Processor 620 is powered by a battery 615 and causes a display 625 to display, for example, a numerical value indicative of the measured air pressure.

An exemplary method of using gauge 100 will now be described. Gauge 100 may first be placed on a valve cap (not shown) mounted on a valve stem of a tire such that sleeve 245 surrounds the valve cap. Release switch 140 is pushed away from end 110 which results in arms 255 urging sections 410 of sleeve 245 into frictional engagement with the valve cap. Gauge 100 is rotated by gripping around recess grip areas 130 to unscrew the valve cap, so as to remove the valve cap from a valve stem. Air pressure in the tire is then measured by engaging gauge 100, through port 115, with and opening the needle valve on a conventional tire valve stem. Pressure sensor 605 measures the air pressure and generates an analog signal indicative of the air pressure, which analog signal is fed to analog-to-digital converter 610. Converter 610 converts the analog signal into a digital signal indicative of the air pressure, which digital signal is fed to processor 620. Processor 620 causes the measured air pressure to be displayed on display 125. Once the air pressure is measured, the valve cap held in sleeve 245 is placed back on the valve stem. Gauge 100 is turned to mount the valve cap on the valve stem. When the valve cap is mounted, release switch 140 is pushed in the direction towards the valve cap, which will cause the grip on the valve cap to be loosened and plunger 235 to push out the valve cap. Thus, one can prevent getting one's hands dirty as well as relatively easily remove valve cap using the pencil gauge with cap wrench 100. Another advantage is the valve cap will not be misplaced or lost when air pressure of a tire is measured.

In the illustrated embodiment, gauge 100 is in the form of pencil gauge, with a port for receiving pressurized air at one end of an elongated housing, and a grip for a cap wrench at the opposite end. However, the housing may also be in other forms.

It will be apparent to those skilled in the art that modifications and variations may be made in the apparatus and process of the present invention without departing from the spirit or scope of the invention. It is intended that the present invention cover the modification and variations of this invention provided they come within the scope of the appended claims and their equivalents.

What is claimed is:

1. A pressure gauge with a valve cap wrench comprising:
   a housing;
   a bore defined in said housing, said bore adapted to accommodate a valve stem cap associated with a body containing a fluid;
   a collet adapted to selectively engage and disengage a valve stem cap associated with a body containing a fluid and accommodated in said bore;
   a user-operable switch adapted to cause said collet to selectively engage and disengage a valve stem cap associated with a body containing a fluid;
   a port defined in said housing, said port adapted to engage and open a needle valve on a valve stem;
   a pressure sensor associated with said housing and adapted to measure the pressure of a fluid in said body when said port engages and opens a needle valve on the valve stem.

2. The pressure gauge of claim 1, wherein said pressure gauge is a tire pressure gauge and wherein the body containing the fluid comprises a tire.

3. The pressure gauge of claim 1, wherein said pressure sensor is positioned within said housing.

4. The pressure gauge of claim 1, wherein said housing further comprises:
   a display on said housing; said display displaying a numerical value indicative of the measured pressure.

5. The pressure gauge of claim 1, wherein said collet further comprises:
   a plurality of arms; and
   a ramp,
   wherein an inward depression of said ramp causes said plurality of arms to contract concentrically, and
   wherein an outward release of said ramp causes said plurality of arms to expand concentrically.

6. The pressure gauge of claim 5, wherein said collet is positioned within said bore.

7. The pressure gauge of claim 5, wherein said ramp comprises a taper which narrows towards said plurality of arms.

8. The pressure gauge of claim 7, further comprising a collar mechanically coupled with said switch, said collar comprising:
   a generally cylindrical interior surface having a constant diameter; and
   an inwardly protruding circumferential lip, said lip adapted to engage said ramp and to inwardly depress said ramp or to disengage said ramp and outwardly release said ramp.

9. The pressure gauge of claim 8, further comprising a plunger coupled to said collar,
wherein, when said switch is pushed by a user in a first direction along said housing away from said bore, said switch causes said lip of said collar to engage and inwardly depress said ramp, thereby causing said plurality of arms to contract concentrically and establish a generally firm grip over a the valve stem cap accommodated in said bore, and
wherein, when said switch is pushed by a user in a second direction along said housing towards said bore, said switch causes said lip of said collar to disengage and outwardly release said ramp, thereby causing said plurality of arms to expand concentrically and release the generally firm grip over the valve stem cap accommodated in said bore and said switch simultaneously causes said plunger to move in the second direction towards said bore and to push the valve stem cap out from said bore.

10. The pressure gauge of claim 5, wherein said ramp comprises a taper which widens towards said plurality of arms.

11. The pressure gauge of claim 5, further comprising a sleeve positioned along an interior surface defined by said plurality of arms, wherein said sleeve contracts concentrically to establish a generally firm grip on a the valve stem cap accommodated in said bore when said plurality of arms contract concentrically and wherein said sleeve expands concentrically to release the generally firm grip on the valve stem cap accommodated in said bore when said plurality of arms expand concentrically.

12. The pressure gauge of claim 11, wherein said sleeve is made of an elastomeric material.

13. The pressure gauge of claim 11, wherein said sleeve further comprises a plurality of relatively inflexible pads on an interior surface of said sleeve, said plurality of relatively inflexible pads adapted to directly engage the valve stem cap accommodated in said bore and to establish the generally firm grip on the valve stem cap when said sleeve contracts concentrically.

14. The pressure gauge of claim 11, wherein said sleeve comprises a plurality of bending sections interspersed between a plurality of curved sections, wherein said plurality of bending sections is adapted to assist said sleeve regain its original shape when said plurality of arms expand concentrically.

15. The pressure gauge of claim 11, wherein each of said plurality of arms comprises a groove, and wherein said sleeve comprises a plurality of longitudinal tabs, each of said plurality of longitudinal tabs being adapted to engage said groove.

16. The pressure gauge of claim 1, further comprising:
an analog-to-digital converter, said converter receiving an analog signal from said pressure sensor and generating a digital signal indicative of the measured pressure;
a processor, said processor receiving said digital signal and causing a display to display a numerical value indicative of the measured pressure; and
a power source, said power source providing power to said processor and to said display.

17. The pressure gauge of claim 1, wherein said housing has a cross-section proximal to said bore larger than a cross-section proximal to said port.

18. A combined tire pressure gauge and a valve cap wrench comprising:
a housing having a bore and a port, wherein said port is adapted to engage and open a needle valve on a tire valve stem;
a collet, wherein said collet comprises:
a generally cylindrical section defining a plurality of longitudinal slits;
a ramp defined on said generally cylindrical section; and
a plurality of arms extending from said generally cylindrical section, wherein an inward depression of said ramp causes a concentric contraction of said plurality of arms, and an outward release of said ramp causes a concentric expansion of said plurality of arms,
a sleeve positioned along an interior surface defined by said plurality of arms, said sleeve adapted to contract and expand concentrically, responsive to concentric contraction and expansion of said plurality of arms respectively, thereby establishing and releasing a generally firm grip over a tire valve stem cap accommodated in said bore respectively;
a collar having an inwardly protruding circumferential lip, said collar positioned generally concentrically with said collet, and said lip adapted to engage said ramp to either inwardly depress said ramp or to outwardly release said ramp;
a user-operable switch coupled to said collar and disposed on the housing, said switch adapted to cause said collar to slide about said collet and cause said lip to inwardly depress or outwardly release said ramp, thereby selectively causing said plurality of arms and said sleeve to either concentrically contract and establish a generally firm grip over a tire valve stem cap accommodated in said bore or to concentrically expand and release a generally firm grip over a tire valve stem cap accommodated in said bore;
a pressure sensor, adapted to be in fluidic communication with a fluid in a tire when said port engages and opens the needle valve on the tire valve stem and to measure the pressure of the fluid in the tire.

19. The combined tire pressure gauge and cap wrench of claim 18, wherein said housing is an elongated housing, wherein said port is defined at a first end of said housing and wherein said bore is defined at a second end of said housing.

20. The combined tire pressure gauge and cap wrench of claim 19, further comprising an angled ball part disposed at said first end, wherein said port is defined by said angled ball part.

* * * * *